Oct. 5, 1965  R. L. RATHER ETAL  3,209,718
DETACHABLE FAIRING ASSEMBLY
Filed June 5, 1964  4 Sheets-Sheet 3
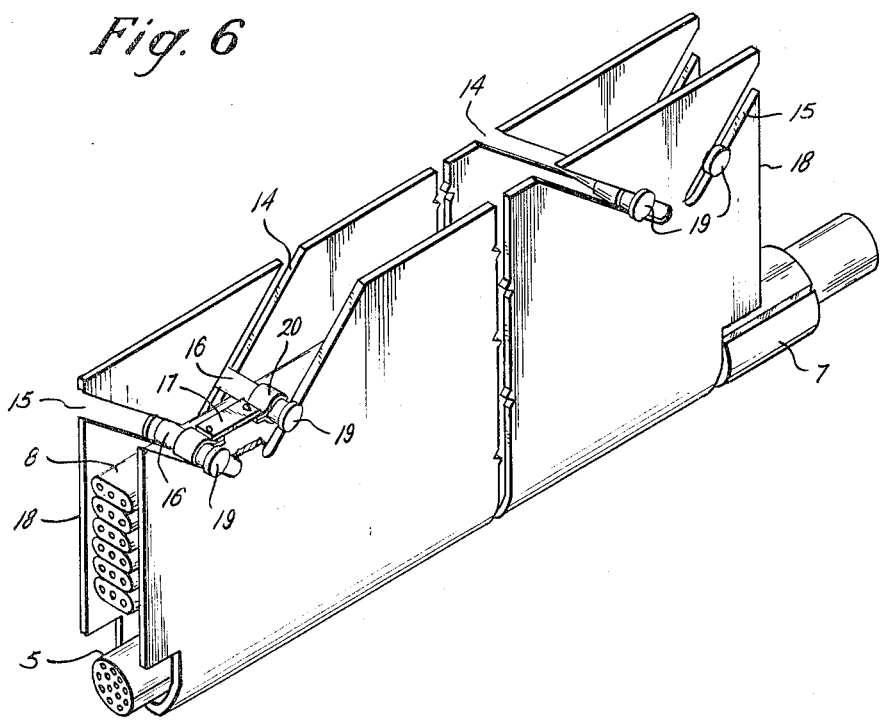
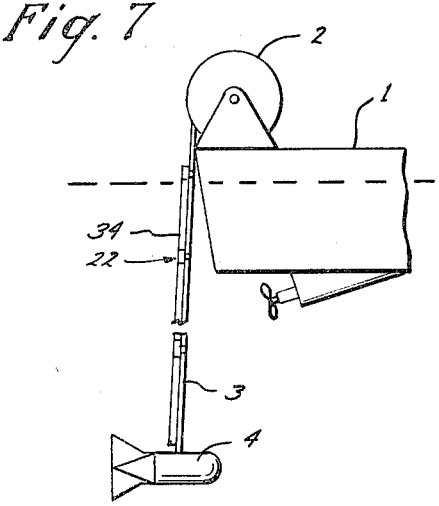
Roy L. Rather
Vilmuth P. Goerland
INVENTORS
BY
Arnold and Roylance
ATTORNEYS

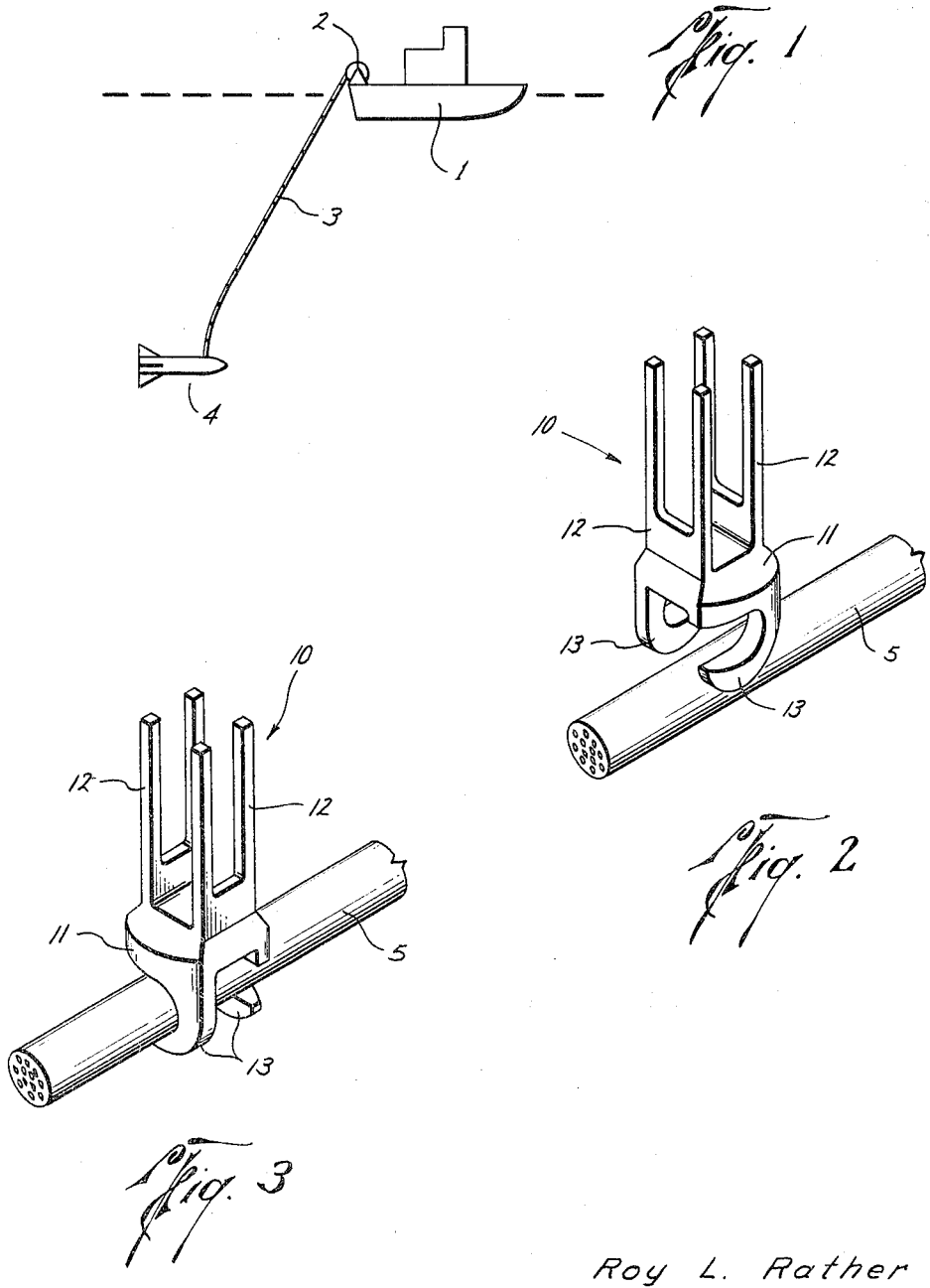

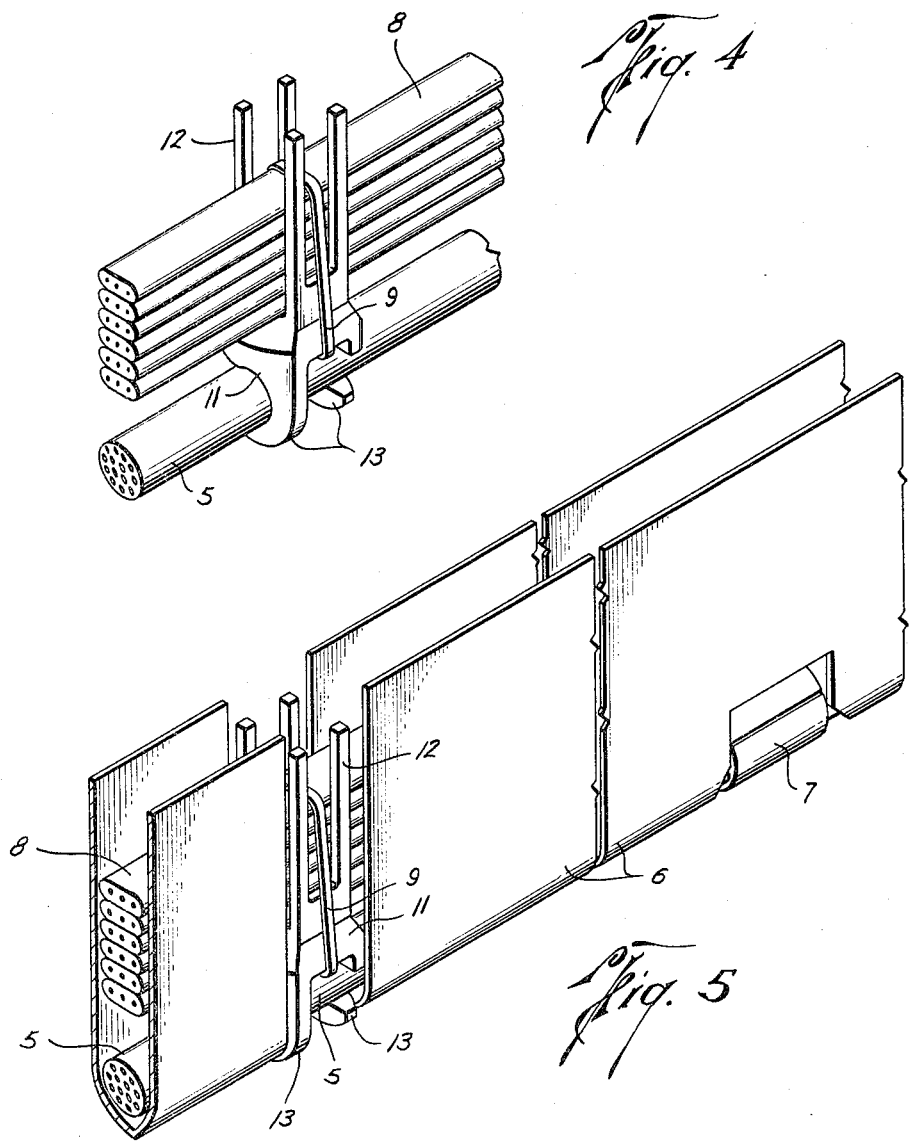

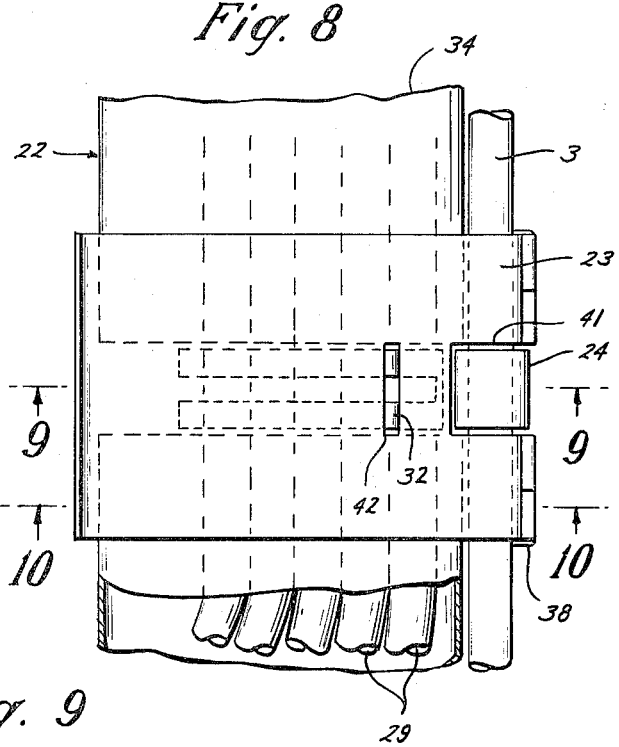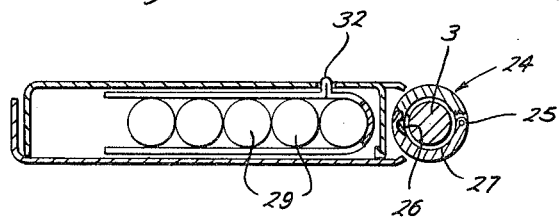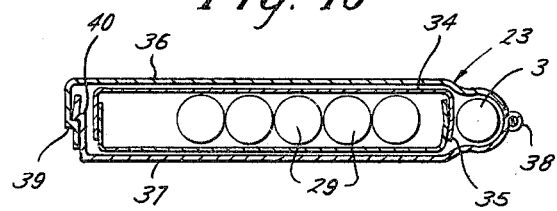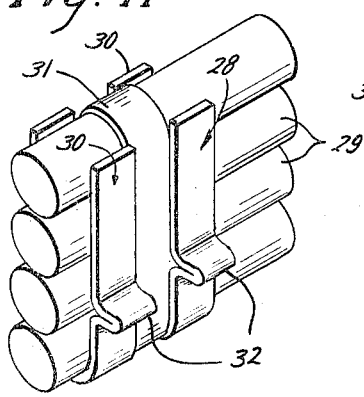

United States Patent Office

3,209,718
Patented Oct. 5, 1965

3,209,718
DETACHABLE FAIRING ASSEMBLY
Roy L. Rather and Vilmuth P. Goerland, Houston, Tex.,
 assignors to Commercial Engineering Corporation,
 Houston, Tex., a corporation of Texas
Filed June 5, 1964, Ser. No. 372,897
35 Claims. (Cl. 114—235)

This application is a continuation-in-part application of my copending patent application No. 299,884, filed Aug. 5, 1963, entitled Detachable Fairing Assembly and now abandoned.

This invention relates to detachable fairing assemblies for use with carriers of sensitive instruments and the like which are towed through a fluid such as water at some distance from a towing vessel, and is particularly concerned with provision of means for relatively quick and efficient assembly and disassembly of the component members of such fairing assemblies.

Generally, faired tow lines comprise a main load-bearing line for supporting an instrument carrier and one or more electrical and/or other conductors, such as hydraulic, through which signals are transmitted from the instrument carrier to a towing vessel. Fairing assemblies provide hydrodynamic stability to the tow line, hence the minimization of vibration, drag, and kiting. Fairings also serve as an envelope into which conductors are inserted and safely supported. Fairings are attached to the load-bearing line as in one illustration by a snap locking mechanism.

Sensors and conductor connectors are also occasionally disposed along the length of the faired assembly. The vibrations set up on a non-faired assembly not only cause fatigue in the lines, but also cause the connections to become loose and set up interference shock patterns in the line that interfere with the sensors.

High drag with bare line is the limiting factor for achieving great depths while towing. An unfaired assembly does not normally descend as vertically as a faired assembly, tending to drift horizontally with the flow of water. Even to reach relatively shallow depths of only a few hundred feet, while the ship is underway, extremely long lengths of unfaired line are required. As the speed of the towing vessel increases the importance of having good hydrodynamic characteristics in the tow-line is accentuated.

Difficulty has been encountered, especially in operations which necessitate a lengthy tow line, in providing a fairing assembly which will be readily detachable for storage and handling and permit rapid and convenient reeling in and out of the towed body and at the same time provide adequate support for the conductors.

It has been found practical in some instances to wind the entire assembly onto an appropriate reel in a "single lay" fashion when surveys are conducted at relatively shallow depths with relatively short tow-line assemblies of only several hundred feet. When the conductors and the load-bearing line are wound together on a single drum, an arrangement such as shown in Rather et al. 3,060,886 is convenient wherein the conductors are wound to compensate for the difference in diameter of being stacked on top of the load-bearing line on the storage drum.

However, when operating at relatively deep levels, it is apparent that it is impractical to employ a drum or reel that is sufficiently large in diameter, and more important, that is sufficiently long between flanges, to conveniently receive and store several thousand feet "single lay" of the bulky tow-line assembly.

Accordingly, it is an object of this invention to provide a fairing assembly which permits easy and rapid reeling in and out of the load-bearing line and the towed body supported thereby and also provides adequate support and protection for the electrical conductors.

It is another object to provide such tow-lines with a easily assembled and disassembled fairing to permit storing and handling of even relatively long lengths of tow line.

It is still another object to provide quick assembly and disassembly of conductors and load-bearing lines to permit separate and convenient storage.

In general the invention comprises a unique fairing construction for attaching conductors to a load-bearing line to permit rapid assembly and disassembly of the conductors and the line for convenient storage. Multiple conductors are joined to each other at predetermined intervals via a mounting assembly, the mounting assemblies illustrated in the drawings being typical of many convenient types. As illustrated in one embodiment, the mounting assembly is shaped so as to have one end for receiving the conductors and the other end for receiving the load-bearing line. The conductors are inserted in the bifurcated end of the mounting assembly and held in place by a band, typically elastic, although other types may also be used. As the load-bearing line is played out from one drum and the conductors, already assembled together with the mounting assemblies, are played out from another drum, the mounting assembly is snapped onto the cable by rotating the cable with respect to the mounting assembly by 90 degrees and letting the cable come into position within the two C-shaped slots.

A clamp inserted in a slot in the channel of the fairing secures the fairing in its axial position along the length of the load-bearing line.

An alternate method for retaining the conductors within the walls of the fairing is through the use of slots cut in the side walls of the fairings, as shown in another embodiment. Rods with large ends to prevent their slipping out of the slots laterally are inserted to ride within the slots. A resilient band is then connected between the rods to bias them toward one another, thereby securing the conductors. When this arrangement is used, the only preparation of the conductors before the conductors are attached to the cable during use is the wrapping of the conductors conveniently together.

Yet another embodiment that accomplishes the objects of the invention comprises clamped adapted to be secured about the load bearing line at intervals along its longitudinal axis, conductor receivers which are adapted to be attached transversely to the axis of the electrical conductors and spaced at intervals therealong so that they are aligned and proximate to the clamps described above, fairings adapted to be secured around the conductors longitudinally between adjacent receivers, and detachable clips which are adapted to longitudinally align said fairings and transmit weight from the conductors to the load-bearing line.

The choice of lengths of the faired sections will vary with the application requirements. Since the fairings are not stored on the drum with the tow-line, in some cases the limiting factor as to length may be handling convenience.

When sensors or other items are to be attached at intermediate intervals along the length of the lowered line, the side walls of the fairings can be slightly spread apart to accommodate such items without materially affecting the good hydrodynamic qualities of the line as a whole.

More particular description of the invention may be had by reference to the embodiments thereof which are illustrated in the appended drawings, which form a part of this specification. It is to be noted however, that the appended drawings illustrate only typical embodiments of the invention and therefore are not to be considered limiting of its scope for the invention will admit of other equally effective embodiments.

In the drawings:

FIG. 1 is a general schematic illustrating the matter in which a survey vessel carries and tows an instrument pod with a faired tow-line of the type with which this invention is concerned.

FIG. 2 is an isometric view of the mounting device of one embodiment and a partial view of a load-bearing line in advance of inter-engagement.

FIG. 3 is an isometric view showing inter-engagement of the mounting device shown in FIG. 2 with a load-bearing line, shown in fragment.

FIG. 4 is an isometric view of the mounting device shown in FIG. 2 engaging both a load-bearing line and a conductor assembly.

FIG. 5 is an isometric view showing the mounting device shown in FIG. 2 in a complete faired tow-line assembly.

FIG. 6 is an isometric view of another embodiment, partly broken away, in a complete, faired tow-line assembly.

FIG. 7 is an elevational view of the assembly of still another embodiment utilized in towing an underwater instrument carrier behind a vessel.

FIG. 8 is an elevational view of a portion of the assembly shown in FIG. 7 secured about the load-bearing line and conductors.

FIG. 9 is a section view along 9—9 of FIG. 8.

FIG. 10 is a section view along 10—10 of FIG. 8.

FIG. 11 is an isometric view of a conductor receiver used in the embodiment shown in FIG. 8.

In the drawings, reference numerals have been employed to indicate parts as follows:

1. Boat
2. Reel
3. Faired tow-line
4. Instrument pod
5. Load-bearing line
6. Fairing
7. Shoulder clamp
8. Conductors
9. Restraining band
10. Mounting
11. Body
12. Bifurcated side walls
13. C shaped members
14. Slot
15. Slot
16. Rod
17. Elastic band
18. End edge
19. Head
20. Center loop
21. Sloping edge
22. Fairing assembly
23. Fairing clip
24. Clamp
25. Pin
26. Lugs
27. Rubber
28. Receiver
29. Conductors
30. Bifurcated extension
31. Tape or elastic bands
32. Locking lug
33. Not used
34. Fairing
35. Crimped end
36. Fairing clip side wall
37. Fairing clip side wall
38. Pin
39. Shoulder
40. Shoulder
41. Yoke
42. Surface The towed faired assembly described herein is schematically represented in FIG. 1 and comprises a faired tow-line 3 supported from a vessel 1. The load-bearing line to which the fairings or fairing clips are attached is played out over reel 2. An instrument carrier or pod is illustrated at 4. Another reel (not shown) carrying conductors can be mounted independently on vessel 1 alongside reel 2. As described herein, this invention allows the conductors to be attached to the load-bearing line in a single streamlined assembly, the channel member being ovoid in cross section, tapering into bilaterally symmetrically side walls. The reels can unwind at different speeds depending on the diameter of the respective drums, thereby eliminating pre-coiling sufficient conductor length to coincide with the length of load-bearing line to be played out. Also should one reel, for example the conductor reel, be exhausted before the other, it is convenient to attach via appropriate connectors to a subsequent drum.

In the embodiment illustrated in FIGS. 2–5, the mounting device of this invention is comprised of an integrally formed member comprised of a material such as nylon and having a base or body member 11 of generally rectilinear configuration. On the top surface of body 11 and at opposite sides thereof a pair of bifurcated side walls 12 extend upwardly in parallel opposing relation and are spaced at a predetermined distance adequate to comfortably receive the quantity, size and shape of conductor members intended to be employed in the particular use involved.

Depending downwardly from the underside of body 11 are a pair of parallel but transversely oppositely opening C shaped clamping members 13 which are positioned at 90 degrees to the bifurcated side walls 12 and adapted to releasably engage the load-bearing line 5 upon being passed over line 5 and rotated 90 degrees as best illustrated by reference first to FIG. 2 and then to FIG. 3.

Thus, this mounting device, and generally indicated by reference numeral 10, may encase a stack of conductors 8, provided with an overlying restraining band 9 which surrounds the body 11 and conductors 8 by passing through the bifurcations of side walls 12 to retain the conductors 8 between bifurcated walls 12 against at least partial longitudinal movement with respect to line 5. Conductors 8 may be of various configurations, such as the generally elongated shape illustrated, and may be electrical, hydraulic, or any other type of conductor that needs to be towed. The restraining band 9 that holds the conductors together may be resilient (such as an elastic band), a tape, cording, or any other convenient wrapping means so as to allow conductors 8 to move longitudinally with respect to line 5.

With the conductors and mounting device thus assembled, as best shown in the FIGS. 2 and 3, the conductor-loaded mounting device 10 may then be passed over the load-bearing line 5 and rotated 90 degrees to completely inter-engage load-bearing line 5 and conductors 8 as best illustrated in FIG. 4, thereby attaching and disconnecting quickly and easily.

Alternate mounting devices may be devised for securing the conductors within the confines of the walls of the fairings. Such mounting devices should have a separating piece for keeping the conductors spaced away from the load-bearing line 5 to prevent wear. Notice that this is accomplished by body 11 in the embodiment illustrated in FIGS. 2–5.

FIG. 6 shows an acceptable alternate structure including inclined slots 14 in the side walls of the fairing combined with rods 15 and an elastic means 17. One slot 14 is cut transversely of the longitudinal axis of the fairing from the open edge of each wall toward the channel. A slight incline toward the nearest fairing end is also illustrated, although such an incline is not necessary for the device to be operable. The other slot 15 is cut in the end edge 18 of each wall from a point near the open edge and inclined toward the channel. The slots, it is seen, diverge toward one another, although even at their closest point they are some distance apart. A rod 16 is inserted into each pair of slots 14 and 15, their lateral movement limited by heads 19 on each end of the rods 16. An elastic band 17 is stretched between them inside the walls of the fairing. It may be convenient to provide a center loop 20 in each rod 16 for ease of attachment. With the band 17 attached, the rods 16 are urged toward one another. Conductors 8 within the walls are hence pressed toward the channel, however they are still somewhat free to move longitudinally with respect to line 5.

In the embodiment illustrated in FIGS. 2–5 and with the load-bearing line 5 and conductors 8 thus assembled, a plurality of fairings 6 recessed to receive quick-disconnect, snap-on or clamp-on shoulders 7 may be passed over the sub-assembly or load-bearing line 5 and conductors 8 as generally illustrated in FIG. 5, shoved into abutment with mounting 10 and then affixed against longitudinal displacement by application of clamp-on shoulder members 7 comprising at least two arcuate, interconnecting pieces or some equivalent device whereupon the entire faired tow-line is completely assembled and ready for use.

The embodiment shown in FIG. 5 illustrates the clamp-on shoulder member 7 being located in a channel slot intermediate the ends of the fairings. The sloping edges 21 on either side of the channel slot facilitate use of the clamp-on member 7. The embodiment shown in FIG. 6 shows the clamp-on member 7 being secured to the load-bearing line within notches located at the ends of the fairings. The clamp 7 is slightly longer than twice the distance that the engaging notch is cut in from the end of the fairing. By notching the adjacent fairings in this manner the fairings are free to move with respect to one another without interference.

It is also suggested that the compliant material located inside clamp 7 that allows the clamp to grip line 3 be cut into segments of less than 180 degrees. A section of less than 180 degrees will cause the clamp not to cling to the line when the clamp is opened.

Still another embodiment of the invention is shown in FIG. 7 where an instrument carrier is towed by means of a tow line 3 behind a vessel 1 which has a reeling drum 2 mounted on the stern. Attached along the longitudinal length of line 3 are fairings 34, secured by clips generally designated as 23.

The fairing assembly 22 is more clearly shown in FIGS. 8, 9, and 10 to which reference is now made. Annular clamp 24 which is affixed at regular intervals along the longitudinal axis of line 3 comprises arcuate halves pivotable about pin 25 to allow opening and closing; the engaging lugs 26 permitting clamp 24 to be latched about line 3. The interior surface of clamp 24 is lined with an annular resilient material such as rubber 27 to grippingly engage line 3 when clamp 24 is closed and latched thereabout, similar in construction to clamp 7 shown in the other embodiments of this invention.

The generally U-shaped bifurcated conductor receiver 28, as particularly illustrated in FIG. 11, receives conductors 29 through its bifurcate extension 30 and is secured thereto by suitable means such as tape 31. While the receivers 28 are bifurcated, it is obvious that annular collars or other suitable structures could be used.

Two of the bifurcate extensions 30 on one side of securing collar 28 have been folded to form upstanding locking lugs 32 which cooperate with fairing clip 23 to support conductors 29 as will be explained in more detail later. The receivers 28 are secured to the conductors 29 at intervals which correspond with the intervals of spacing of the clamps 24 in such a manner that receivers 28 and clamps 24 can be aligned as illustrated in FIG. 8.

To either side of receiver 28 as illustrated in FIG. 8 are fairings 34 which are longitudinally aligned with line 3 and conductors 29. As illustrated by FIG. 10, fairings 34 comprise two rectilinear halves secured together by the overlapping crimped ends 35, and the length of the fairing 34 parallel to the direction of flow exceeds the width of the faces disposed transverse to the direction of flow of body 4 through a fluid. The fairings 34 permit passage of conductors 29 therethrough and the proximate ends of adjacent fairings 34 proximately abut the receivers 28 as illustrated in FIG. 8.

Fairing clip 23 which is disposed about line 3, receiver 28, electrical conductors 29, and proximate ends of adjacent fairings 34 comprise two side walls 36 and 37 illustrated in cross section in FIG. 10, side walls 36 and 37 being pivotable about pin 38 and adapted to be closed and latched by the stepped shoulders 39 and 40 formed in side walls 36 and 37, respectively. Clip 23 like fairings 34 has a length parallel to the direction of flow in excess of that transverse to the direction of flow, and has a cross-sectional length and width in excess of that of a fairing 34 to allow clip 23 to overlap fairings 34 at proximate ends thereof as illustrated in FIG. 8 to maintain the fairings 34 in longitudinal alignment.

Particularly with tow lines which are lengthy it is impractical to wind the tow line and fairings about a drum carried by the towing vessel because to protect fairing only a single lay on the drum is practical. Hence, the drum would have to be of an impractical diameter and/or length to accommodate the entire length of line and fairings and it is thus necessary to provide a tow line and fairing structure which will permit the use of a reasonable size drum, and yet permit ease of handling and rapid reeling out and in of the tow line. The illustrated embodiments of the invention are a practical solution to the above problems.

It is apparent from the foregoing that any length of fairing sections can be used. Particularly, there is no limitation with regard to length, other than for handling convenience, since there is no requirement to reel the fairings together with the tow-line onto a stowage drum.

To demonstrate the typical use of the present invention, the embodiment shown in FIGS. 7–11 is discussed. In operation, line 3, about which have been placed the clamps 24, similar in construction to clamps 7 appearing in FIGS. 5 and 6, is disposed about the drum 2. To lower or reel out the line 3, the drum 2 is actuated in a counterclockwise direction as viewed in FIG. 7, and as the line 3 is fed from the drum, the preassembled fairing unit comprising conductors 29, fairings 34, and receivers 28 is manually aligned with line 3 and attached thereto by manual application of fairing clips 23.

It is obvious that several methods of preassembling the fairing unit which is attached to line 3 can be used. For example, a plurality of fairings could be aligned and the conductors 29 passed therethrough, and then receivers 28 fixed about conductors 29 between adjacent fairings 34.

Perhaps the simplest method of pre-assembling the fairing unit is to place the receivers 28 at desired intervals along electrical conductors 29 and then clamp the separate fairing side walls about conductors 29 between adjacent receivers 28.

In any event, as carrier 4, is lowered by actuating drum 2, the pre-assembled fairings 34, conductors 29, and receivers 28 are aligned and proximate to the line clamps 24, and then the fairing clip 23 is manually clipped about the line 3 to form a pre-assembled unit as illustrated in FIG. 8 so that the U-shaped yoke 41 in fairing clip side walls 36 and 37 receive and are restricted from movement by the shoulders of clamp 24.

As the line 3 is reeled in, the clips and fairings are manually removed and line 3 is wound about drum 2. The preassembled fairing units, after removal from line 3, are stacked on the deck of the vessel 1 or racked in a convenient container.

This method of clipping the fairing unit 22 to the line 3 facilitates the speed at which the line 3 may be reeled in and out from the vessel 1 and yet permits the use of a reasonable size drum 2 since only line 3 to which has been affixed the clamps 24 is disposed about drum 2.

Clip 23 not only maintains fairings 34 in longitudinal alignment but also at least partially transmits the weight of the conductors 29 to the load-bearing line 3. To illustrate, as the force of gravity acts on the conductors 29, locking lugs 32 will press downward on surface 42 causing the fairing clip 23 to be forced downward on line clamp 24. Thus, at least part of the weight of conductors 29, depending on the allowed slippage, will be transmitted through receiver 28, lugs 32, clip 23 and clamp 24 to the load bearing line 5, minimizing possibility of stretching and failure in conductors 29 due to weight of the conductors 29 and fairing 34 which may also rest on receiver 28. It should also be noted that, in the position of use, conductors 29 are substantially parallel along their entire lengths to load bearing line 5, thereby effecting a savings in conductor lengths needed compared with the previous integrated fairing assemblies having snake-like conductors, such as shown in Rather et al. 3,060,886.

When sensors or conductor connectors are disposed along the length of the tow-line, they are sometimes too thick to fit either between adjacent fairing sections or between the side walls of the fairings. The fairing walls can, however, be pried apart slightly to accommodate such sensors and/or connectors without materially impairing the overall hydrodynamic characteristics of the assembly.

While an annular clamp has been used in the description as the means for preventing longitudinal movement of the fairing or fairing clip relative to the tow line, various equivalent methods could be used. For example, the clip or fairing channel could be provided with a rubber liner to grippingly engage the tow line when the clip or fairing is latched thereabout.

While three embodiments of the invention have been described, it is obvious that various substitutes of structure may be made without varying from the scope of the invention as defined in the accompanying claims.

What is claimed is:
1. In combination with a marine tow-line assembly comprising a load-bearing line and at least one conductor external to such line, the further combination therewith of
   a plurality of removable fairings having two side walls embracing the external conductor at intervals along its longitudinal axis,
   quick-disconnect means for holding the conductor within said side walls of said fairings so as to permit longitudinal movement with respect to the load-bearing line,
   a plurality of quick disconnect, snap-on clamps secured along the load-bearing line comprising at least two arcuate interconnecting pieces for embracing the load-bearing line for transmitting the weight of said fairings and holding means to the load-bearing line.

2. A marine tow-line assembly in accordance with claim 1, wherein
   each of said clamps is secured to the load-bearing line at a point intermediate opposing ends of adjacent fairings;
   each of said holding means comprises
      conductor receiver means attached at intervals along the longitudinal axis of the conductor at a point intermediate opposing ends of adjacent fairings and having a locking lug, and
      clip means secured about one of said clamps, said receiver means, and the proximate ends of adjacent fairings to transmit at least part of the weight of the conductor to the load-bearing line and having a slot in securing engagement with said locking lug.

3. A marine tow-line assembly in accordance with claim 1, wherein
   each of said holding means comprises
      a generally rectilinear body disposed between the load-bearing line and the conductor at a point intermediate opposing ends of adjacent fairings;
      parallel bifurcated side walls extending upwardly from two sides of said body and embracing the conductor;
      means securing said conductor between said bifurcated side walls; and
      parallel side walls extending downwardly from the other two sides of said body, said downwardly extending side walls being transversely recessed to define oppositely opening C shaped slots which releasably engage and substantially surround the load-bearing line.

4. A marine tow-line assembly in accordance with claim 1 wherein said side walls of each of said fairings comprise a front edge, a back edge, a top end edge, and a bottom end edge, said holding means comprising
   said side walls having a first pair of slots, one in each opposing side wall, approximately parallel to one another extending from the back edge toward the front edge, and
   a second pair of slots, one in each opposing side wall, approximately parallel to one another extending from one end edge at a point near the back edge inwardly inclined toward the front edge,
   a first rod movably engageable along and within said first pair of slots and secured against displacement transverse to said side walls,
   a first connecting point intermediate the ends of said first rod,
   a second rod movably engageable along and within said second pair of slots and secured against displacement transverse to said side walls,
   a second connecting point intermediate the ends of said second rod, and
   resilient means connected, one end to said first connecting point and one end to said second connecting point for biasing said first and second rods toward one another to hold the conductor within said side walls of said fairings.

5. In combination with a marine tow-line assembly comprising a load-bearing line and at least one conductor external to such line, the further combination therewith of
   a plurality of removable fairings having two side walls embracing the external conductor at intervals along its longitudinal axis,
   quick-disconnect means for holding the conductor within said side walls of said fairings so as to permit longitudinal movement with respect to the load-bearing line and for spacing the conductor apart from the load-bearing line, and
   a plurality of quick disconnect, snap-on clamps secured along the load-bearing line and comprising at least two arcuate interconnecting pieces for embracing the load-bearing line for transmitting the weight of said fairings and means to the load-bearing line and at least part of the weight of said conductor.

6. In combination with a marine tow-line assembly comprising a load-bearing line and at least one conductor external to such line, the further combination therewith of
   a plurality of removable fairings having two side walls embracing the external conductor at intervals along its longitudinal axis,
   first quick-disconnect means for holding the conductor within said side walls of said fairings so as to permit longitudinal movement with respect to the load-bearing line,
   second means for spacing the conductor apart from the load-bearing line, and
   a plurality of quick disconnect, snap-on clamps secured along the load-bearing line and comprising at least two arcuate interconnecting pieces for embracing the load-bearing line for transmitting the weight of said fairings, holding means, and spacing means to the load-bearing line and at least part of the weight of said conductor.

7. A marine tow-line assembly in accordance with claim 6, wherein
each of said clamps is secured to the load-bearing line at a point intermediate opposing ends of adjacent fairings;
said holding means comprises
conductor receiver means attached at intervals along the longitudinal axis of the conductor at a point intermediate opposing ends of adjacent fairings, and
clip means secured about one of said clamps, said receiver means, and the proximate ends of adjacent fairings to transmit at least part of the weight of the conductor to the load-bearing line; and
said spacing means includes a locking lug in said receiver means in securing engagement with a slot in said clip means.

8. A marine tow-line assembly in accordance with claim 6, wherein
each of said holding means comprises
a generally rectilinear body disposed between the the load-bearing line and the conductor at a point intermediate opposing ends of adjacent fairings;
parallel bifurcated side walls extending upwardly from two sides of said body and embracing the conductor;
means securing said conductor between said bifurcated side walls; and
each of said spacing means comprises
parallel side walls extending downwardly from the other two sides of said body of said holding means, said downwardly extending side walls being transversely recessed to define oppositely opening C shaped slots which releasably engage and substantially surround the load-bearing line.

9. A marine tow-line assembly in accordance with claim 6, wherein said side walls of each of said fairings comprise a front edge, a back edge, a top end edge, and a bottom end edge, said holding means comprising
said side walls having a first pair of slots, one in each opposing side wall, approximately parallel to one another extending from the back edge toward the front edge, and
a second pair of slots, one in each opposing side wall, approximately parallel to one another extending from one end edge at a point near the back edge inwardly inclined toward the front edge,
a first rod movably engageable along and within said first pair of slots and secured against displacement transverse to said side walls,
a first connecting point intermediate the ends of said first rod,
a second rod movably engageable along and within said second pair of slots and secured against displacement transverse to said side walls,
a second connecting point intermediate the ends of said second rod, and
resilient means connected one end to said first connecting point and one end to said second connecting point for biasing said first and second rods toward one another to hold the conductor within said side walls of said fairings.

10. In a marine tow-line assembly comprising a load-bearing line and at least one conductor external to the load-bearing line, the combination of
a fairing having
an arcuate channel embracing the load-bearing line and including a slot opening, and
two side walls extending from said channel embracing the external conductor;
quick disconnect, snap-on clamping means comprising at least two arcuate interconnecting pieces for embracing the load-bearing line and engaging said slot in said channel for securing said fairing to the load-bearing line; and
a quick-disconnect mounting means for keeping the conductor spaced from the load-bearing line and contained within said side walls of said fairing so as to permit longitudinal movement with respect to the load-bearing line.

11. A marine tow-line assembly in accordance with claim 10, wherein
said arcuate channel in said fairing includes a slot opening intermediate the ends of said channel.

12. A marine tow-line assembly in accordance with claim 10, wherein
said arcuate channel in said fairing includes a slot opening located at one end of said channel.

13. In combination with a marine tow-line assembly comprising a load-bearing line and at least one conductor external to such line, the further combination therewith of
a plurality of removable fairings having two side walls adapted to embrace the external conductor at intervals along its longitudinal axis,
quick-disconnect means adapted to hold the conductor within said side walls of said fairings so as to permit substantially parallel placement of the conductor along the length of the conductor with respect to the load-bearing line,
a plurality of quick disconnect, snap-on clamps each comprising at least two arcuate interconnecting pieces for embracing the load-bearing line, said clamps secured along the load-bearing line adapted to transmit the weight of said fairings and means to the load-bearing line and at least part of the weight of said conductor.

14. A marine tow-line assembly in accordance with claim 13, wherein
each of said clamps is adapted to be secured to the load-bearing line at a point intermediate opposing ends of adjacent fairings;
each of said means comprises
conductor receiver means adapted for attachment at intervals along the longitudinal axis of the conductor at a point intermediate opposing ends of adjacent fairings and having a locking lug,
clip means adapted to be secured about one of said clamps, said receiver means, and the proximate ends of adjacent fairings to transmit at least part of the weight of the conductor to the load-bearing line and having a slot adapted for securing engagement with said locking lug.

15. A marine tow-line assembly in accordance with claim 13, wherein
each of said means comprises
a generally rectilinear body for disposition between the load-bearing line and the conductor at a point intermediate opposing ends of adjacent fairings;
parallel bifurcated side walls extending upwardly from two sides of said body and adapted to embrace the conductor;
means for securing said conductor between said bifurcated side walls; and
parallel side walls extending downwardly from the other two sides of said body, said downwardly extending side walls being transversely recessed to define oppositely opening C shaped slots for releasably engaging and substantially surrounding the load-bearing line.

16. A marine tow-line assembly in accordance with claim 13, wherein said side walls of said fairings comprise a front edge, a back edge, a top end edge, and a bottom end edge, said means comprising a first pair of slots approximately parallel to one another extending from the back edge of said side walls toward the front edge, a second pair of slots approximately parallel to one another extending from one end edge of said side walls at a point near the back edge inwardly inclined toward the front edge, a first rod movably engageable along and within said first pair of slots and secured against displacement transverse to said side walls, a first connecting point intermediate the ends of said first rod, a second rod movably engageable along and within said second pair of slots and secured against displacement transverse to said side walls, a second connecting point intermediate the ends of said second rod, and resilient means adapted to be connected one end to said first connecting point and one end to said second connecting point for biasing said first and second rods toward one another to hold the conductor within said side walls of said fairings.

17. In a marine tow-line assembly comprising a load-bearing line, at least one external conductor and a plurality of fairings along said line and embracing both the line and conductor, the mounting improvement comprising a generally rectilinear body disposed between the line and the conductor at a point intermediate opposing ends of adjacent fairings, parallel bifurcated side-walls extending upwardly from two sides of said body and embracing the conductor, means securing the conductor between said bifurcated side walls, and parallel side walls extending downwardly from the other two sides of said body, said downwardly extending side walls being transversely recessed to define oppositely opening C shaped slots which releasably engage and substantially surround the line.

18. In a marine tow-line assembly comprising a load-bearing line, at least one external conductor and a plurality of fairings along said line and embracing both the line and conductor the mounting improvement comprising a generally rectilinear body disposed between the line and the conductor at a point intermediate opposing ends of adjacent fairings, parallel bifurcated side-walls extending upwardly from two sides of said body and embracing the conductor, means securing said conductors between said bifurcated side walls, and parallel downward extensions of the other two sides of said body, said downward extensions terminating in resilient, oppositely facing, C shaped members which releasably clampingly engage the line.

19. In a marine tow-line assembly comprising a load-bearing line, at least one external conductor and a plurality of fairings along said line and embracing both the line and conductor, the mounting improvement comprising a generally rectilinear body disposed between the line and conductor at a point intermediate opposing ends of adjacent fairings, parallel, bifurcated members integral with said body and extending upwardly from two sides thereof to embrace the conductor, means securing the conductor between said bifurcated side walls, and parallel side walls extending downwardly from the other two sides of said body, said downwardly extending side walls being transversely recessed to define oppositely opening C shaped slots which releasably engage and substantially surround the line.

20. In a marine tow-line assembly comprising a load-bearing line, at least one external conductor and a plurality of fairings along the line and embracing both the line and conductor, the mounting improvement comprising a generally rectilinear body disposed between the line and conductor at a point intermediate opposing ends of adjacent fairings, parallel bifurcated side-walls extending upwardly from two sides of said body and embracing the conductor, a restraining band extending from one side of said body up and over the conductor to the other side of said body to retain the conductor between said bifurcated side-walls, and parallel side walls extending downwardly from the other two sides of said body, said downwardly extending side walls being transversely recessed to define oppositely opening C shaped slots which releasably engage and substantially surround the line.

21. In a marine tow-line assembly comprising a load-bearing line, at least one external conductor and a plurality of fairings along said line and embracing both the line and conductor, the mounting improvement comprising a generally rectilinear body disposed between the line and conductor at a point intermediate opposing ends of adjacent fairings, parallel bifurcated side-walls extending upwardly from two sides of said body and embracing the conductor, means securing the conductor between said bifurcated side walls, and parallel, oppositely faced, transversely opening resilient C shaped clamps integral with and extending downwardly from the other two sides of said body to releasably engage the line.

22. In a marine tow-line assembly comprising a load-bearing line, at least one external conductor and a plurality of fairings along said line and embracing both the line and conductor the mounting improvement comprising a body member carried between the line and conductor at a point intermediate opposing ends of adjacent fairings, said body being of greater width than the fairings, parallel bifurcated side-walls extending upwardly from two sides of said body and embracing the conductor, means securing the conductor between said bifurcated side walls, and parallel side walls extending downwardly from the other two sides of said body, said downwardly extending side walls being transversely recessed to define oppositely opening C shaped slots which releasably engage and substantially surround the line.

23. In a marine tow-line assembly comprising a load-bearing line, at least one external conductor and a plurality of fairings along said line and embracing both the line and conductor, the mounting improvement comprising a body member carried between the line and conductor at a point intermediate opposing ends of adjacent fairings, said body being of greater width than the fairings, parallel, bifurcated members integral with said body and extending upwardly from two sides thereof to embrace the conductor, a restraining band extending from one side of said body up and over the conductor to the other side of said body to retain the conductor between said bifurcated side-walls, and parallel, oppositely faced, transversely opening resilient C shaped clamps integral with and extending downwardly from the other two sides of the said body to releasably engage the line.

24. In a marine tow-line assembly comprising a load-bearing line, at least one external conductor and a plurality of fairings comprising two side walls along said line and embracing both the line and conductor, a front edge, a back edge, the mounting improvement comprising a plurality of snap-on, quick-disconnect clamps each comprising at least two arcuate interconnecting pieces for embracing the load-bearing line for transmitting the weight of the fairings to the load-bearing line, said side walls having a first pair of slots, one in each opposing side wall, approximately parallel to one another extending from the back edge toward the front edge, and a second pair of slots, one in each opposing side wall, approximately parallel to one another extending from one end edge at a point near the back edge inwardly inclined toward the front edge, a first rod movably engageable along and within said first pair of slots and secured against displacement transversely to said side walls, a first connecting point intermediate the end of said first rod, a second rod movably engageable along and within said second pair of slots and secured against displacement transverse to said side walls, a second connecting point intermediate the ends of said second rod, and resilient means connected one end to said first connecting point and one end to said second connecting point biasing said first and second rods toward one another to hold the conductor within said side walls of said fairings substantially parallel to the load-bearing line so that at least part of the weight of the conductor is transmitted to the load-bearing line.

25. In a combination with a marine tow-line assembly comprising a load-bearing line, at least one external conductor, a plurality of fairings along said line, each of said fairings having a channel member embracing said line, said channel member being ovoid in cross section and having bilaterally symmetrical arcuate side walls and slotted through its apex, and quick-disconnect means for holding the conductor within the side walls of said fairings so as to permit longitudinal movement with respect to said load-bearing line, the further combination therewith of a plurality of quick-disconnect, snap-on clamps secured along the load-bearing line comprising at least two arcuate interconnecting pieces for embracing said load-bearing line for transmitting the weight of the fairings and holding means to the load-bearing line and at least part of the weight of the conductor, each of said clamps being larger in outside diameter than the inside diameter of the channel member and mateably received within the apex slot to releasably engage and retain the line within the channel.

26. In a marine tow-line assembly in accordance with claim 25, wherein each of said clamps has a plurality of arcuate packing segments of less than 180 degrees attached to the inside surfaces of said clamp for providing a quick release from said line when said clamp is opened.

27. In a combination with a marine tow-line assembly comprising a load-bearing line, at least one external conductor, a plurality of fairings along said line, quick-disconnect means for holding the conductor within the side walls of said fairings so as to permit substantially parallel placement of the conductor along the length of said conductor with respect to said load-bearing line, each of said holding means having a channel member embracing said line, said channel member being ovoid in cross section and having bilaterally symmetrical arcuate side walls and slotted through its apex, the further combination therewith of a plurality of quick-disconnect, snap-on clamps secured along the load-bearing line comprising at least two arcuate interconnecting pieces for embracing said load-bearing line for transmitting the weight of the fairings and holding means to the load-bearing line and at least part of the weight of the conductor, each of said clamps being larger in outside diameter than the inside diameter of the channel member and mateably received within the apex slot to releasably engage and retain the line within the channel.

28. In a marine tow-line assembly in accordance with claim 27, wherein each of said clamps has a pluarity of arcuate packing segments of less than 180 degrees attached to the inside surfaces of said clamp for providing a quick release from said line when said clamp is opened.

29. A tow-line fairing system for towing an instrument carrier through water comprising a main load bearing elongate cylindrical line for supporting an instrument carrier;

a plurality of snap-on, quick disconnect clamps secured about said line at regular intervals along its longitudinal axis, each of said clamps comprising two interconnecting arcuate sections hingedly disposed to be opened, closed, and latched, and an annular rubber liner secured to the interior of said clamp to grippingly engage said cable when said arcuate sections are closed thereabout;

a plurality of conductors communicating with said towed carrier, the longitudinal axis of said conductors being substantially parallel to the axis of said line;

a plurality of bifurcated receivers secured transversely to the longitudinal axis of said conductors at intervals coinciding with the intervals of spacing of said clamps, said bifurcated receivers being provided with locking lugs protruding from the outer surface thereof;

a fairing secured about said conductors between each adjacent set of receivers;

fairing clips secured about said line, said line clamps, said receivers, said conductors, and a portion of the proximate ends of adjacent fairings, said fairing clips comprising:

side walls pivotably mounted to be opened, closed, and latched, each of said walls forming a yoke to permit said side walls to be closed about said clamp, and one of said side walls having an opening therein to permit passage of said locking lugs therethrough, said fairing clips cooperating with said clamps and said receivers to provide longitudinal support for said conductors, and maintain longitudinal alignment of said fairings.

30. A detachable fairing assembly for use in towing an instrument carrier through water, said carrier being connected to a towing vessel through an elongate load bearing member and conductor means which have substantially parallel and proximate longitudinal axes, comprising snap-on, quick-disconnect clamping means with interlocking pieces adapted to be secured about said load bearing member along said member's longitudinal axis;

conductor receiver means for attachment at intervals along the longitudinal axis of said conductor in such a manner that said receiver means may be proximately aligned with said clamping means said receiver means permitting substantially parallel placement of said conductor means along the length of the load bearing member;

fairing means adapted to be secured about said conductor means between adjacent conductor receiver means;

clip means adapted to be secured about said clamping means, said receiver means, said conductor means, and proximate ends of said fairing means to maintain said fairing means in longitudinal alignment and transmit at least part of the weight of said conductor means to said load bearing member.

31. A detachable fairing assembly for use in towing an instrument carrier through water, said carrier being connected to a towing vessel through an elongate load bearing member and elongate conductor means which load bearing member and conductor means have substantially parallel and proximate longitudinal axes, comprising snap-on, quick-disconnect clamps having interconnecting pieces each clamp adapted to be secured about said load bearing member at intervals along its longitudinal axis, said clamps being provided with a resilient interior surface to grippingly engage said load bearing member;

receiver means each of which is adapted to be attached to said conductor means along the longitudinal axis thereof whereby said receiver means are proximate to and aligned with said clamps, said receiver means permitting substantially parallel placement of said conductor means along the length of the load bearing member, fairings adapted to permit passage of said conductor means therethrough, each of said fairings being adapted to cover said conductor means along the interval between adjacent conductor receiver means; and fairing clips, each of which is adapted to be secured about and engage an aligned clamp and receiver means and proximate ends of said adjacent fairings to maintain longitudinal alignment of said fairings and transmit at least part of the weight of said conductor means to said load bearing member.

32. A detachable fairing assembly for use in towing an instrument carrier through water, said object being connected to a towing vessel through an elongate load bearing member and elongate conductor means which load bearing member and conductor means have substantially parallel and proximate longitudinal axes, comprising snap-on, quick disconnect clamps having interconnecting pieces each clamp adapted to be secured about said load bearing member at intervals along its longitudinal axis, said clamps grippingly engaging said load bearing member when placed thereabout;

receivers each of which is adapted to be disposed transversely across the longitudinal axis of said conductor means and be secured thereto at intervals whereby said receivers are proximate to and aligned with said clamps, said receiver means permitting substantially parallel placement of said conductor means along the length of the load-bearing member, fairings adapted to permit passage of said conductor means therethrough, each of said fairings being adapted to cover said conductor means between adjacent conductor receivers;

and fairing clips each of which comprises:

halves pivotably mounted to be closed and latched about and engaged by an aligned clamp and receiver and proximate ends of adjacent fairings to maintain longitudinal alignment of said fairings and transmit at least part of the weight of said conductor means to said load bearing member.

33. A detachable fairing assembly for use in towing an instrument carrier through water, said carrier being connected to a towing vessel through an elongate tow line and a plurality of elongate conductors, said line and conductors having substantially parallel and proximate longitudinal axes, comprising snap-on, quick disconnect clamps each of which is adapted to be secured about said line at intervals along the longitudinal axis of said line, said clamps comprising two arcuate halves pivotably mounted to permit said halves to be closed and latched about said line whereby the inner resilient surface of said clamp will grippingly engage said line, bifurcated receivers each of which is adapted to be disposed transversely across the longitudinal axis of said plurality of conductors and be secured thereto at intervals whereby said receivers will be proximate to and aligned with said clamps;

fairings adapted to permit passage of said conductors therethrough, each of said fairings being adapted to cover said conductors between adjacent receivers;

fairing clips each of which comprises halves pivotably mounted to permit said clip to be placed transversely to said line, conductors and proximate ends of adjacent fairings and closed therearound whereby said clip engages said line, said aligned clamp and bifurcated receiver, and a portion of the proximate ends of fairings disposed on either side of said bifurcated receiver to maintain said fairings in longitudinal alignment and transmit at least a part of the weight of said conductors to said tow line.

34. A detachable fairing assembly for use in towing an instrument carrier through water comprising a receiver adapted to be disposed transversely to the longitudinal axis of and engage conductors passing therethrough;

fairings adapted to extend above and below said receiver for carriage of said conductors, the proximate ends of said fairings being adjacent said receiver;

a fairing clip adapted to engage and disengage said fairings, said receiver and said conductors with a tow line communicating said instrument carrier and a towing vessel, said conductors being secured substantially parallel to said tow line;

snap-on, quick-disconnect clamp means having interconnecting arcuate pieces for preventing longitudinal movement of said clip relative to said tow line, said clip by engaging said receiver and said proximate ends of said fairings causing longitudinal alignment of said fairings and the weight carried by said receiver to be transferred to said tow line.

35. A detachable fairing assembly for use in towing an instrument carrier through water comprising a receiver adapted to be disposed transversely to the longitudinal axis of conductors and engaged therewith;

fairings adapted to extend above and below said receiver for carriage of said conductors, the proximate ends of said fairings being adjacent the said receiver;

a fairing clip adapted to engage and disengage said fairings, said receiver and said conductors with a tow line communicating said instrument carrier and a towing vessel, said conductors being secured substantially parallel to said tow line;

snap-on, quick-disconnect clamp means having interconnecting arcuate pieces for preventing longitudinal movement of said clip relative to said tow line, said clip engaging said receiver and said proximate ends of said fairings causing longitudinal alignment of said fairings and the weight carried by said receiver to be transferred to said tow line.

References Cited by the Examiner

UNITED STATES PATENTS

| | | | |
|---|---|---|---|
| 2,401,783 | 6/46 | Wilcoxon | 114—235 |
| 3,060,886 | 10/62 | Rather et al. | 114—235 |
| 3,092,067 | 6/63 | Armstrong | 114—235 |

MILTON BUCHLER, *Primary Examiner.*

FERGUS S. MIDDLETON, *Examiner.*